United States Patent [19]
Kato et al.

[11] Patent Number: 5,989,659
[45] Date of Patent: Nov. 23, 1999

[54] DOUBLE-GLAZING UNIT

[75] Inventors: Hidemi Kato; Tetsuo Minaai, both of Osaka, Japan

[73] Assignee: Nippon Sheet Glass Co., Ltd., Osaka, Japan

[21] Appl. No.: 08/952,840

[22] PCT Filed: Mar. 27, 1997

[86] PCT No.: PCT/JP97/01065

§ 371 Date: Nov. 24, 1997

§ 102(e) Date: Nov. 24, 1997

[87] PCT Pub. No.: WO97/36838

PCT Pub. Date: Sep. 10, 1997

[30] Foreign Application Priority Data

Apr. 3, 1996 [JP] Japan ..................................... 8-81121

[51] Int. Cl.$^6$ ....................................................... E04C 2/34
[52] U.S. Cl. .......................... 428/34; 52/786.13; 428/120
[58] Field of Search .............................. 428/34, 120, 192, 428/212, 220; 52/786.13; 156/107, 109

[56] References Cited

U.S. PATENT DOCUMENTS 4,928,448   5/1990   Phillip ........................................ 428/34

*Primary Examiner*—Donald Loney

[57] ABSTRACT

This invention relates to double glazing having two glass sheets with numerous spacers arranged therebetween, a void therebetween being sealed in a decompressed condition. Conventionally, the glass sheets have edges thereof spaced from each other by a seal. Under the influence of the binding force of the seal atmospheric pressure tends to act less on outermost spacers than on the other spacers. Consequently, the outermost spacers tend to move between the glass sheets. According to this invention, an outer interval (L1) between each outermost row of spacers (2) and a seal (4) is set at least equal to a basic interval (L0) between the outermost row and a second row adjacent thereto. Consequently, the spacers in the outermost rows bear a larger share of atmospheric pressure acting on the sheet surfaces than the spacers in the other rows. A sufficient force is secured to hold the spacers in the outermost rows in place, thereby preventing the spacers in the outermost rows from moving between the two glass sheets.

7 Claims, 3 Drawing Sheets

DOUBLE-GLAZING UNIT

FIELD OF THE INVENTION

This invention relates to double glazing in which two sheets of glass have numerous first void sustaining elements arranged in rows at predetermined intervals along and between sheet surfaces, and a second void sustaining element disposed between entire outer edges of the glass sheets for sealing a void between said glass sheets in a decompressed state.

BACKGROUND OF THE INVENTION

Generally, heat insulation may be provided for partitions (walls and roofs) of structures by using an insulating material. However, partitions with openings such as doors and windows must be opened and closed with facility and have transparency. It is therefore difficult to apply an insulating material to such partitions over entire areas thereof. The openings having no insulating material applied thereto tend to be defective in terms of heat insulation. Double glazing has been conceived for use in these openings, which includes two sheets of glass joined together with a layer of air formed therebetween to act as an insulating layer.

Such double glazing has a disadvantage that the glass sheets per se are thick and, in combination with the sash, tend to present an unsightly appearance. Thus, a thin and highly insulating double glazing has been conceived, in which two sheets of glass have numerous spacers (corresponding to the above-mentioned first void sustaining elements and in the form of small columns not to be obstructive to transparency) distributed therebetween, and the second void sustaining element disposed between entire edges of the two lass sheets, to provide a decompressed void between the glass sheets.

With the spacers and the second void sustaining element provided, a predetermined void is secured between the glass sheets even if the void is decompressed. This type of double glazing will be described with reference to FIG. 4. Spacers 10 are arranged at basic spacer intervals (hereinafter called basic intervals) 11 which are set based on the strength of glass sheets 1. The intervals between outermost spacers 10a and second void sustaining element 12 (hereinafter called outer intervals) are often determined by calculating down to a fraction, to be within a range not exceeding the basic intervals 11, and by taking the width (or length) of the glass sheets into account. This is because the size of glass sheets usually is not an integral multiple of the above basic interval.

The edges of the two glass sheets are bound by the second void sustaining element. However, where, in the above double grazing, the outer intervals 13 are smaller than the basic intervals 11, atmospheric pressure tends to act less on the outermost spacers 10a than on the other spacers under the influence of the binding force of the second void sustaning element 12. Consequently, the glass sheets impart an insufficient holding force to the spacers, whereby the spacers could easily move between the glass sheets. If the spacers move between the glass sheets, the spacer arrangement becomes unbalanced to impair appearance. In addition, increased variations occur in the stress condition of the glass sheets to reduce their strength.

The object of this invention, therefore, is to provide a double glazing which overcomes the above disadvantage and restrains movement of the first void sustaining elements.

SUMMARY OF THE INVENTION

The above object is fulfilled by the invention defined in the claims.

This invention provides numerous first void sustaining elements arranged in rows at predetermined intervals along sheet surfaces between glass sheets, and a second void sustaining element disposed between entire outer edges of the glass sheets, and is characterized in that an outer interval between each outermost row of the first void sustaining elements and the second void sustaining element is set at least equal to a basic interval between each outermost row and a second row adjacent thereto.

According to this construction, since the outer interval is set at least equal to the basic interval, the first void sustaining elements in the outermost rows bear a larger share of atmospheric pressure acting on the sheet surfaces than the first void sustaining elements in the other rows. The increased share of atmospheric pressure can compensate for the shortage of the holding force for the first void sustaining elements in the outermost rows due to the binding force of the second void sustaining element applied to the glass sheets as encountered in the prior art. As a result, substantially the same holding force acts on all of the first void sustaimng elements, thereby preventing the first void sustaig elements in the outermost rows from moving between the two glass sheets. With the double glazing, according to this invention, it is now possible to avoid the arrangement of the first void sustaing elements becoming unbalanced to impair appearance and reduce strength as a result of movement of the first void sustaining elements between the glass sheets.

Moreover, the second void sustaining element applies an increased binding force to the glass sheets, thereby providing an improved sealing performance.

Preferably, the outer interval is set equal to to twice the basic interval.

It is still more desirable to set the outer interval 1.25 times to twice the basic interval.

With this construction, besides avoiding the first void sustaining elements becoming unstable and easily movable as noted above, the glass sheets are protected against breakage. If the outer interval were larger to excess than the basic interval, increased surface tensile stress would occur with the glass sheets bound by the second void sustaning element increases, to break the glass sheets.

That is, movement of the first void sustaining elements may be prevented since the multiplying factor of the outer interval with respeet to the basic interval has minimum value 1. Since the multiplying factor has maximum value 2, the surface tensile stress in edge regions of the glass sheets bound by the second void sustaining element may be restrained within a permissible level of stress of the glass sheets to avoid breaking of the glass sheets.

Advantageous features of this invention are set forth in the other dependent claims.

DETAILED DESCRIPTION OF THE INVENTION

An embodiment of this invention will be described in detail hereinafter with reference to the drawings.

Figure 1:
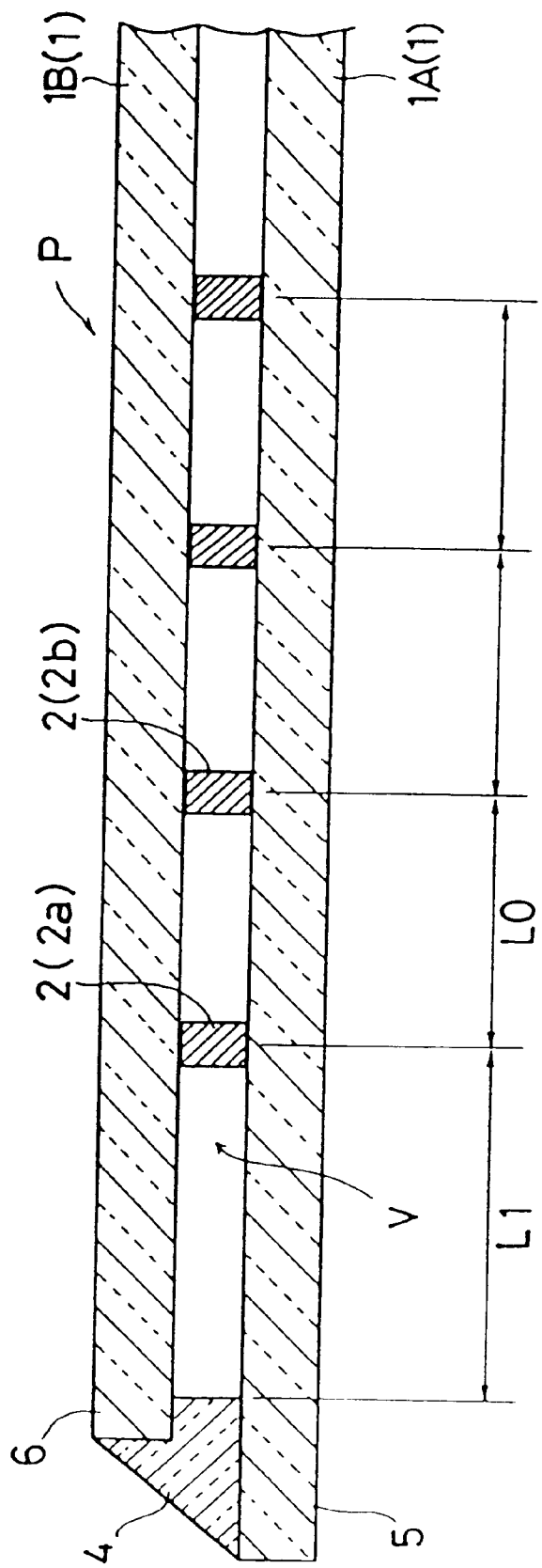
FIG. 1 is a sectional view showing a double glazing.
Figure 2:
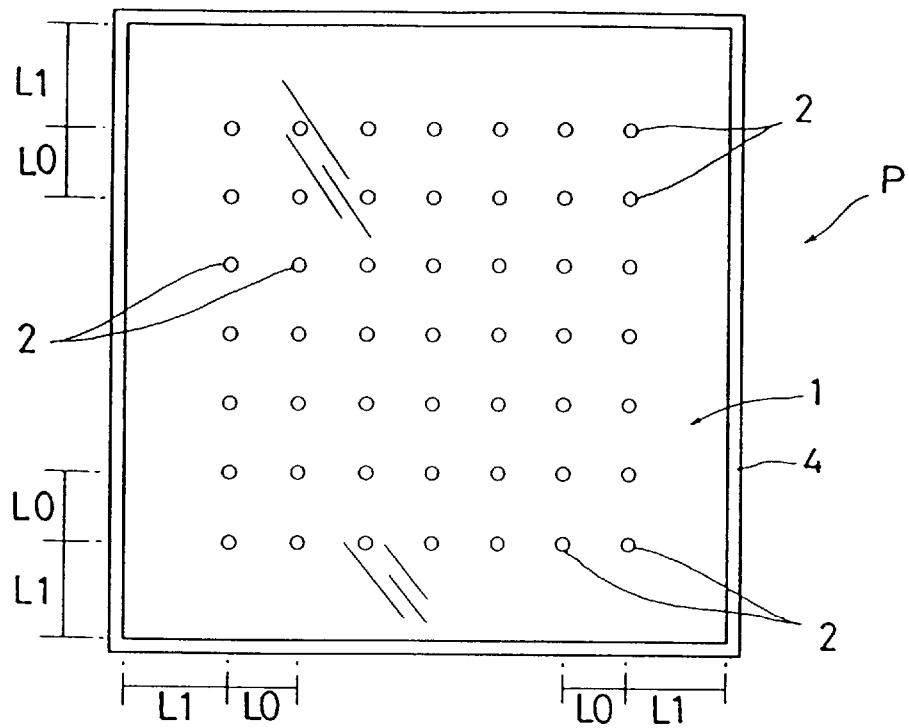
FIG. 2 is a front view showing the double glazing.

FIGS. 1 and 2 show an example of double glazing according to this invention. The double glazing P includes a pair of glass sheets 1, with numerous spacers (which are one example of the first void sustaining elements) 2 arranged at intervals along and between sheet surfaces, to provide a decompressed void V between the glass sheets 1A and 1B.

Each of the glass sheets 1 is 3 mm thick and formed of transparent float glass sheet. The void V is sealed with a seal (which is one example of the second void sustaining element) 4 formed of low melting point glass (e.g. solder glass) between outer edges of the two glass sheets 1. The void V is decompressed ($1.0 \times 10^{-3}$ Torr or less), for example, by manufacturing the double glazing in a vacuum environment or by applying suction after the double glazing is manufactured.

The outer edges of the glass sheets 1 are formed such that one of the glass sheets 1A projects in directions parallel to the plate surfaces. Peripheries of the void V are sealed efficiently and reliably by depositing a sealing material on projecting portions 5 when forming the seal 5.

Preferably, the spacers 2 are formed of a material having a compressive strength of at least 5 t/cm$^2$. In this embodiment, the spacers 2 are formed of stainless steel (e.g. JIS SUS304). Where the spacers 2 have low strength, the spacers 2 will be broken under atmospheric pressure acting on the glass sheets 1. Then, it is impossible to secure the void V, thereby lowering insulating performance.

The spacers 2 are in the form of cylindrical columns. Their diameter is set to about 0.5 mm and the height to about 0.2 mm (±0.01 mm). With the shape of cylindrical column, portions contacting the glass sheets 1 include no corners where stress would tend to concentrate. Thus, the spacers 2 provide reliable support for the glass sheets 1. Further, the cylindrical columns may advantageously have rounded peripheries (instead of defining shape edges).

Regarding the arrangement of numerous spacers 2, outer interval L1 between each outermost row of spacers 2 and the seal 5 is set equal to or larger than basic interval L1 between each outermost row and each second row of spacers 2 adjacent the outermost row.

In this embodiment, basic interval L0 is about 20 mm, and outer interval L1 is in the range of about 20 to 40 mm which is equal to to twice basic interval L0.

Where outer interval L1 is set equal to basic interval L0, i.e. L1=20 mm, substantially the same compressive stress (holding stress) acts on spacers 2a in the outermost rows and spacers 2b in the second rows. This avoids a situation where the spacers 2a in the outermost rows in particular may move easily. It has been confirmed that the smaller the outer interval L1 is than the basic interval L0, the smaller share of atmospheric pressure acting on the sheet surfaces is borne by the spacers 2a in the outermost rows, and the less compressive stress (holding stress) acts on the spacers 2a in the outermost rows because of the binding force of the seal 5 applied to the edges of the double glazing, whereby the spacers 2a in the outermost rows move easily (see Table 1).

Table 1 shows results of experiment carried out by arranging the spacers at intervals L0 set to 20 mm and intervals L1 set every 5 mm in the 10 to 40 mm range, and counting the number of spacers 2a in the outermost rows having moved. The experiment has shown that, where L1 was set to 10 mm and 15 mm, 51 and 12, respectively, out of a total of 60 spacers in the outermost rows moved, which would be problematic in practical use. Where L1 was set to 20 to 40 mm, movement of the spacers in the outermost rows was substantially prevented. It is particularly desirable to set L1 in the range of 25 to 40 mm. That is, L1 should be set to 1.25 times to twice L0. With such setting, movement of the spacers in the outermost rows is prevented reliably, appearance is not impaired, and variations in the stress condition of the glass sheets are minimized to produce no defect in terms of strength.

TABLE 1

| L0 (mm) | L1 (mm) | spacer movement | |
|---|---|---|---|
| | | number moved | total in outermost rows |
| 20 | 10 | 51 | 60 |
| | 15 | 12 | 60 |
| | 20 | 1 | 56 |
| | 25 | 0 | 56 |
| | 30 | 0 | 52 |
| | 35 | 0 | 52 |
| | 40 | 0 | 48 |

It has also been confirmed that, where outer interval L1 is set to twice basic interval L0, i.e. L1=40 mm, surface tensile stress in edge regions of the glass sheets bound by the seal 5 reaches approximately the same value as permissible long-term tensile stress of the glass sheets. Thus, by setting the outer interval L1 within twice the basic interval L0, the internal stress of the glass sheets is restrained within the permissible tensile stress, thereby to avoid the glass sheets brealdng due to the sealed decompression of the void V.

Figure 3:
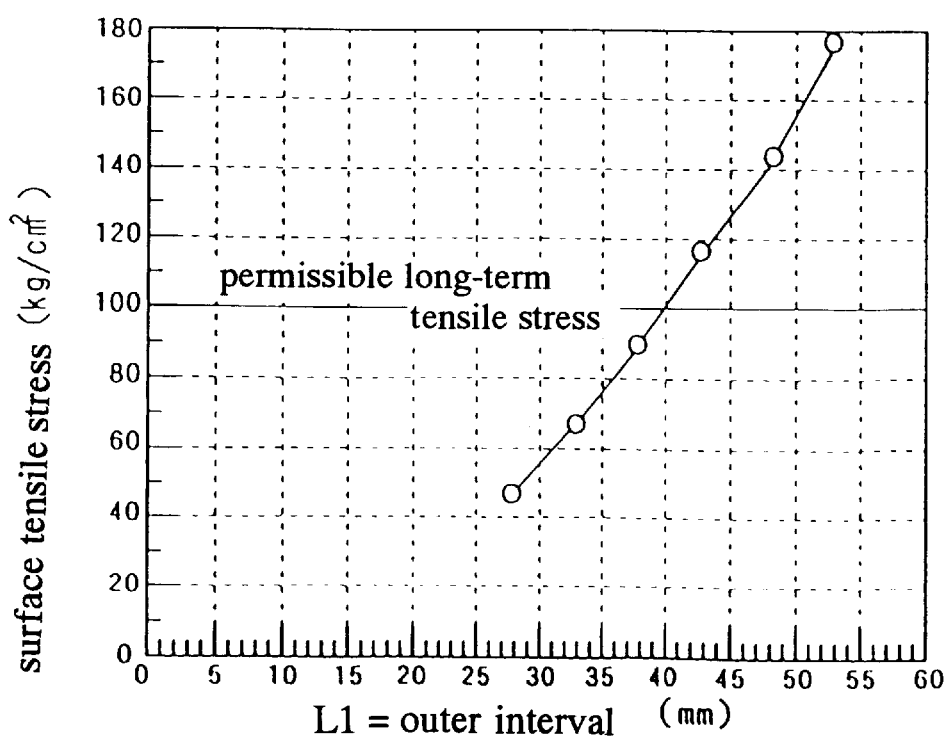
FIG. 3 is a view showing surface tensile stress at edges of glass sheets.
Figure 4:
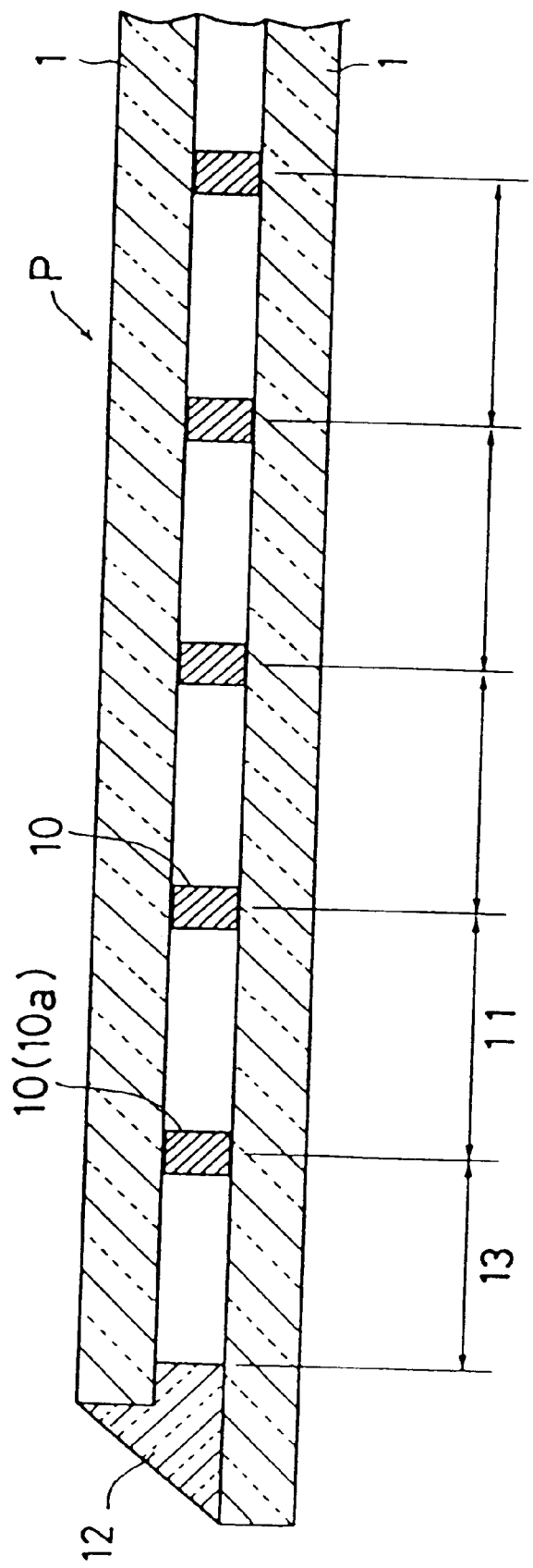
FIG. 4 is a sectional view of a conventional double glazing for comparison with the double glazing according to this invention.

FIG. 3 shows results of expermnent carried out on the above double glazing P to determine the relationship between outer interval L1 and the surface tensile stress in the edge regions of the glass sheets bound by the seal 5.

In this experiment, the surface tensile stress in the edge regions 6 of the glass sheets bound by the seal 5 was measured for six cases in which the outer intervals L1 were increased every 5 mm from 28 mm to 53 mm.

The results show that the surface tensile stress tends to increase with outer interval L1. Where L1=40 mm (corresponding to twice the value of L0), the surface tensile stress reaches 100 kg/cm$^2$ which is the permissible long-term tensile stress of 3 mm thick float glass sheets.

Other embodiments will be described hereunder.

The first void sustaining elements are not limited to the stainless steel spacers described in the foregoing embodiment, but may be formed of inconel 718 alloy, a metal having a compressive strength of at least 5 t/m$^2$, quartz glass, ceramics or a compound of these materials. In short, the first void sustaining elements may be formed of any material having a compressive strength of at least 5 t/m$^2$, which is not easily deformable under external force to maintain the two glass sheets out of contact with each other. The first void sustaining elements may also have varied dimensions and shapes.

The basic intervals are not limited to the 20 mm noted in the foregoing embodiment, but may be set appropriately based on the thickness and strength of the glass sheets. The outer intervals are set based on the basic intervals. In short, the outer intervals serve the purpose if set equal to or larger than the basic interval Preferably, the outer intervals are set equal to to twice the basic interval, and particularly 1.25 times to twice the basic interval.

The glass sheets are not limited to the 3 mm thickness noted in the foregoing embodiment, but may have a different thickness. The type of glass may be selected as desired, such as from figured glass, frosted glass (glass given surface treatment to diffuse light), wire glass or other reinforced glass, heat absorbing glass, ultraviolet absorbing glass and heat reflecting glass.

We claim:

1. Double glazing comprising two sheets of glass have numerous first void sustaining elements arranged in rows at predetermined intervals along and between sheet surfaces, and a second void sustaining element disposed between the entire outer edges of the glass sheets for sealing a void between said glass sheets in a decompressed state, wherein an outer interval between each outermost row of said first void sustaining elements and said second void sustaining element is set at least equal to a basic interval between said outermost row and a second row adjacent thereto.

2. Double glazing as defined in claim 1, wherein said outer interval is set equal to twice said basic interval.

3. Double glazing as defined in claim 2, wherein said outer interval is set 1.25 times to twice said basic interval.

4. Double glazing as defined in claim 3, wherein one of said glass sheets has outer edges projecting along said plate surfaces.

5. Double glazing as defied in claim 3, wherein said first void sustaining elements are formed of a stainless steel material having a compressive strength of at least 5 t/cm$^2$.

6. Double glazing as defined in claim 3, wherein said first void sustaining elements in form of cylindrical columns about 0.5 mm in diameter and about 0.2 mm (±0.01 mm) in height.

7. Double glazing as defined in claim 3, wherein said basic interval is about 20 mm and said outer interval is in a range of about 25 to 40 mm.

\* \* \* \* \*

UNITED STATES PATENT AND TRADEMARK OFFICE
CERTIFICATE OF CORRECTION

PATENT NO. : 5,989,659
DATED : November 23, 1999
INVENTOR(S) : Kato Dunn et al.

It is certified that error appears in the above-identified patent and that said Letters Patent is hereby corrected as shown below:

In column 1, line 36, change "lass" to read as - - glass - -.
In column 2, line 25 change "sustaimg" to read as - - sustaining - -.
In column 2, line 25, change "sustaig" to read as - - sustaining - -.
In column 2, line 29, change "sustaing" to read as - - sustaining - -.
In column 2, line 46, change "sustaning" to read as - - sustaining - -.
In column 3, line 27, delete the space between 5 and t/cm² in "5 t/cm" to read as - - 5t/cm² - -.
In column 4, Table 1, column 1 line 18 delete "20".
In column 4, Table 1, column 1, line 21, insert --20--.
In column 4, line 65, insert a period after the word "interval" to read as - - interval. - -.
In column 6, line 8, change "defied" to read as - - defined - -.

Signed and Sealed this

Nineteenth Day of December, 2000

Attest:

Q. TODD DICKINSON

*Attesting Officer*                *Commissioner of Patents and Trademarks*